(12) United States Patent
Sumida et al.

(10) Patent No.: US 6,805,103 B1
(45) Date of Patent: Oct. 19, 2004

(54) CYLINDER-INJECTION FUEL INJECTION VALVE

(75) Inventors: Mamoru Sumida, Tokyo (JP); Norihisa Fukutomi, Tokyo (JP); Masayuki Aota, Tokyo (JP); Keita Hosoyama, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 420 days.

(21) Appl. No.: 09/258,138

(22) Filed: Feb. 26, 1999

(30) Foreign Application Priority Data

Mar. 2, 1998 (JP) .......................................... 10-049609

(51) Int. Cl.[7] .............................................. F02M 55/02
(52) U.S. Cl. ..................... 123/470; 123/472; 239/533.2
(58) Field of Search ................. 123/470, 509, 123/472, 458; 239/533.2, 600, 533.1, 533.3–533.12, 584, 585.1–585.5

(56) References Cited

U.S. PATENT DOCUMENTS

| | | | | |
|---|---|---|---|---|
| 4,589,596 A | * | 5/1986 | Stumpp | 123/470 |
| 4,966,120 A | * | 10/1990 | Itoh | 123/470 |
| 5,129,658 A | * | 7/1992 | Berton | 123/470 |
| 5,345,913 A | * | 9/1994 | Belshaw | 123/470 |
| 5,630,400 A | | 5/1997 | Sumida et al. | |
| 5,706,787 A | * | 1/1998 | Fujikawa | 123/470 |
| 5,785,024 A | * | 7/1998 | Takei | 123/470 |

FOREIGN PATENT DOCUMENTS

| | | | | |
|---|---|---|---|---|
| DE | 3340445 | * | 5/1995 | 123/470 |
| JP | 7-30368 | | 6/1995 | |

* cited by examiner

*Primary Examiner*—Carl S. Miller
(74) *Attorney, Agent, or Firm*—Sughrue Mion, PLLC

(57) ABSTRACT

The present invention comprises a housing main body, a valve assembly disposed within the housing main body and provided with a valve main body having a large-diameter cylinder portion and a small-diameter cylinder portion, a valve seat having a fuel injection aperture secured within the valve main body and a needle valve for closing and opening the fuel injection aperture, a seal ring held between a cylinder head and a shoulder portion when the valve assembly is inserted into an insertion port in the cylinder for preventing combustion gas in the cylinder from leaking into the housing main body and a welded joint for securing the valve main body to the housing main body disposed between the side of the large-diameter cylinder portion and an engaging portion on the housing main body.

5 Claims, 7 Drawing Sheets

CYLINDER-INJECTION FUEL INJECTION VALVE

BACKGROUND OF THE INVENTION

1. Field of the Invention

The present invention relates to a cylinder-injection fuel injection valve mounted in a fuel injection valve insertion port on a cylinder head for injecting fuel through a fuel injection aperture into a cylinder.

2. Description of the Related Art

FIG. 5 is a cross-section showing the complete construction of a conventional cylinder-injection fuel injection valve 1 (hereinafter simply "fuel injection valve"), FIG. 6 is a partial enlargement of FIG. 5, and FIG. 7 is a plan view of the fork in FIG. 5.

The fuel injection valve 1 comprises: a housing main body 2; a valve assembly 3 disposed within the housing main body 2; a solenoid assembly 4 disposed within the housing main body 2; and an elastic seal ring 7 with a wave-shaped cross-section in the axial direction disposed between a fuel injection valve insertion port 6 in a cylinder head 5 and the tip of the housing main body 2.

The valve assembly 3 comprises: a stepped, hollow, cylindrical valve main body 11 having a small-diameter cylinder portion 9 and a large-diameter cylinder portion 10; a valve seat 13 having a fuel injection aperture 12 secured within an end portion of the valve main body 11; a needle valve 14 being a valve body moved into and out of contact with the valve seat 13 to close and open the fuel injection aperture 12; a swirler 15 for guiding the needle valve 14 in the axial direction as well as imparting a swirling motion to the fuel as the fuel flows towards the fuel injection aperture 12; and a movable armature 16 secured to the other end of the needle valve 14.

An intermediate portion of the needle valve 14 is formed with: a guide portion 17 for guiding the needle valve 14 as it slides along the inner circumferential surface of the valve main body 11; and a flange portion 19 for contacting a spacer 18 within the housing main body 2.

The housing main body 2 comprises: a first housing 21 having a flange for mounting the fuel injection valve 1 on the cylinder head 5; a second housing 22 connected to one end of the first housing 21; and a holder 23 connected to the other end of the first housing 21.

The solenoid assembly 4 comprises: a coil 24 of wound wire; a bobbin on which the coil is mounted; a cylindrical core 26 attached to an inner circumferential portion of the bobbin 25; a sleeve 27 secured to the inside of the core 26; a spring 28 compressed and disposed between an end portion of the sleeve 27 and an end portion of the needle valve 14 for pressing the needle valve 14 against the valve seat 13; and terminals 29 electrically connected to the wire of the coil 24.

The swirler 15 constituting part of the valve assembly 3 is a hollow, cylindrical member which has a central aperture 30 at its center for supporting the needle valve 14 so that the needle valve 14 can slide in both axial directions, and is provided with: a first end surface 31 in contact with the valve seat 13; a second end surface 32 at the opposite end from the valve seat 13; and an outer surface 34 between these two end surfaces 31, 32 which comes into contact with an inner circumferential surface 33 of the valve main body 11.

First passages 35 extending radially are formed in the second end surface 32 of the swirler 15 such that fuel flows through the first passages 35 from inner circumferential portions of the second end surface 32 to outer circumferential portions thereof.

Second passages 36 extending longitudinally and connected to the first passages 35 are formed in the outer surface 34 of the swirler 15.

Swirling grooves 37 are formed in the first end surface 31 of the swirler 15 in connection with the second passages 36 for generating a swirling current.

The tip of a fuel injection valve 1 of the above construction is inserted into the fuel injection valve insertion port 6 in a cylinder head 5. An insertion port shoulder portion 38 and a countersunk face 39 are formed within the fuel injection valve insertion port 6.

A metal gasket 40 is disposed between the flange 20 and the countersunk face 39.

As shown in FIG. 7, both sides of the flange 20 are pressed against the cylinder head 5 by a fork 41 secured to the cylinder head 5 by a securing bolt 42, whereby the gasket 40 is pressed against the countersunk face 39 and the seal ring 7 is compressed. As a result, one side 43 of the seal ring 7 presses against a contact surface 44 of the holder 23 and the other side 45 presses against the surface of the insertion port shoulder portion 38, preventing the high-temperature, high-pressure combustion gas in the cylinder from leaking into the housing main body 2 by means of a so-called "double seal construction".

Next, the operation of a fuel injection valve 1 of the above construction will be explained.

When an electric current is supplied to the coil 24 of the solenoid assembly 4 from outside through the terminals 29, a magnetic flux is generated in the magnetic passage formed by the movable armature 16, the core 26, and the housing main body 2, whereby the movable armature 16 is attracted against the elasticity of the spring 28 towards the core 26. Thus, the needle valve 14, which is integrated with the movable armature 16, is moved upwards as far as the position where the flange portion 19 of the needle valve 14 contacts the spacer 18. The guide portion 17 is guided in the axial direction by the inner circumferential surface of the valve main body 11 as the needle valve 14 moves upwards.

As the needle valve 14 moves upwards, the tip of the needle valve 14 is separated from the valve seat 13, forming a gap between the tip thereof and the valve seat 13. As a result, high-pressure fuel fed from a fuel supply pipe 46 flows in through a fuel filter 8, through a fuel passage 47 within the sleeve 27, through the gap formed between the needle valve 14 and the valve main body 11, through the first passages 35 in the second end surface 32 into the second passages 36 in the outer surface 34, then the high-pressure fuel flows into the swirling grooves 37 of the first end surface 31. The fuel forms a swirling current inside the swirling grooves 37 and is sprayed from the fuel injection aperture 12 into the cylinder (not shown).

In a fuel injection valve 1 of the above construction, the valve main body 11 is secured by a crimped portion 50 formed on the tip of the first housing 21, but a problem is that, since the crimped portion 50 does not have a smooth, flat surface, it is not possible to prevent high-temperature, high-pressure combustion gas from leaking to the housing main body 2 even if one side 43 of the seal ring 7 is in contact therewith, requiring that a holder 23 having a smooth, flat contact surface 44 be purposely prepared and pressed fitted over the tip of the first housing 21.

SUMMARY OF THE INVENTION

The present invention aims to solve the above problem and an object of the present invention is to provide a cylinder-injection fuel injection valve enabling manufacturing costs to be reduced by eliminating the need for the holder conventionally required as a contact surface for the seal ring, as well as facilitating the assembly process by eliminating the need to press fit the holder.

To this end, according to the present invention, there is provided a cylinder-injection fuel injection valve comprising: a housing main body; a valve assembly disposed within the housing main body and provided with: a valve main body having a large-diameter cylinder portion and a small-diameter cylinder portion; a valve seat having a fuel injection aperture secured within the tip of the valve main body; and a valve body moved into and out of contact with the valve seat to close and open said fuel injection aperture; a seal held between a cylinder head and a shoulder portion between the large-diameter cylinder portion and the small-diameter cylinder portion when the tip of the valve assembly is inserted into an insertion port in a cylinder for preventing combustion gas in a cylinder from leaking to the housing main body; and a securing means for securing the valve main body to the housing main body disposed between the side of the large-diameter cylinder portion and an engaging portion formed on the tip of the housing main body.

DETAILED DESCRIPTION OF THE PREFERRED EMBODIMENTS

Embodiment 1

Figure 1:
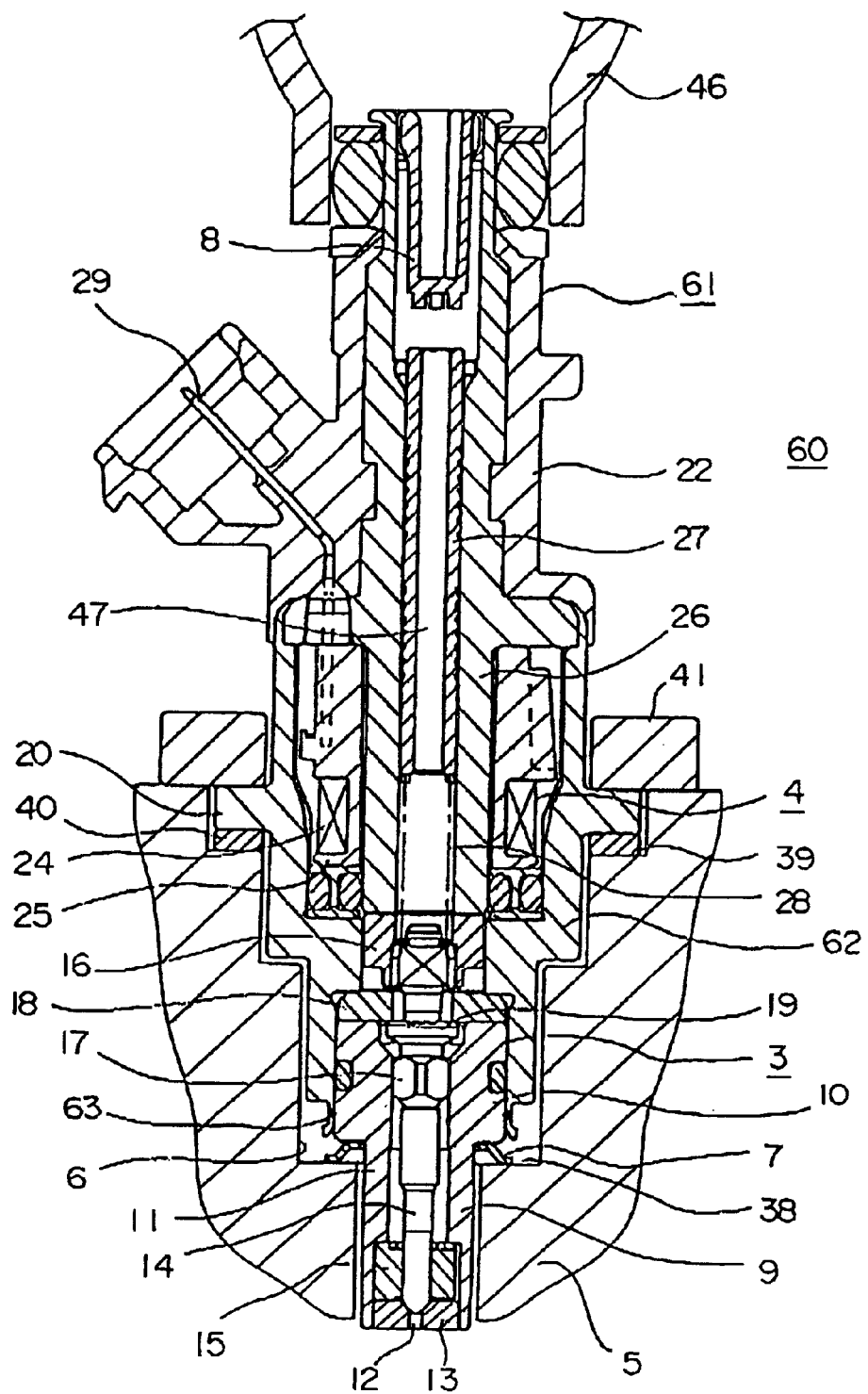
FIG. 1 is a cross-section of a cylinder-injection fuel injection valve according to Embodiment 1 of the present invention.
Figure 2:
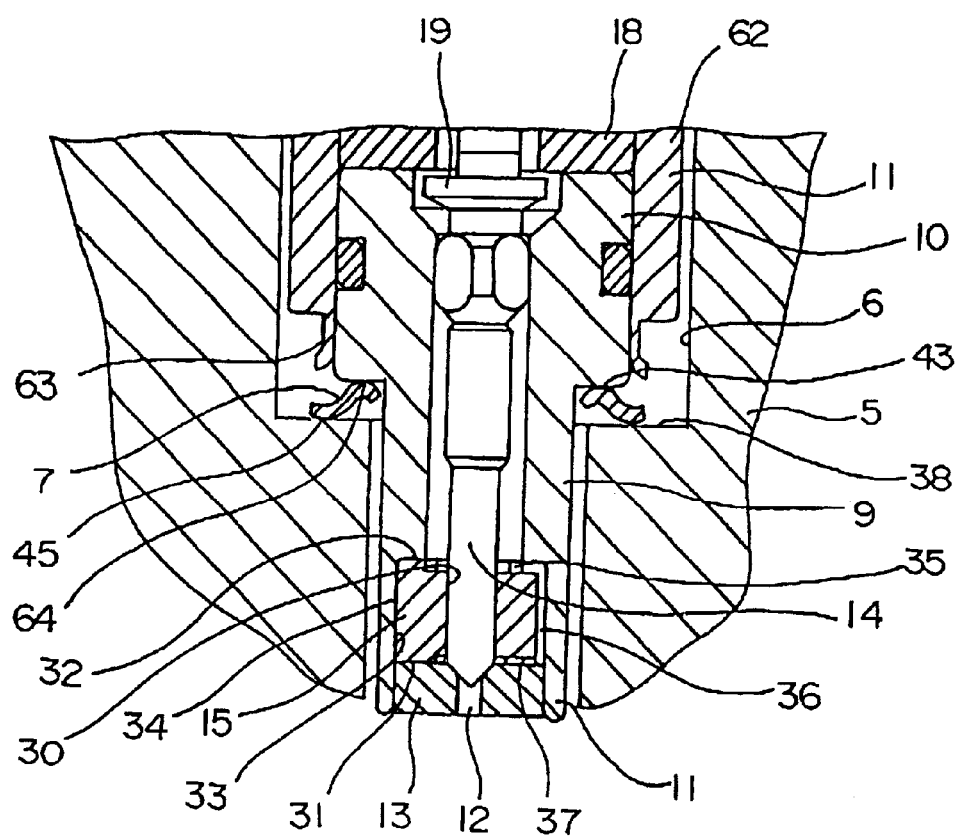
FIG. 2 is a partial enlargement of the cylinder-injection fuel injection valve in FIG. 1.

FIG. 1 is a cross-section showing the complete construction of a cylinder-injection fuel injection valve 60 (hereinafter simply "fuel injection valve") according to the present invention, and FIG. 2 is a partial enlargement of FIG. 1.

The fuel injection valve 60 comprises: a housing main body 61; a valve assembly 3 disposed within the housing main body 61; a solenoid assembly 4 disposed within the housing main body 61; and an elastic seal ring 7 with a wave-shaped cross-section in the axial direction disposed between a fuel injection valve insertion port 6 in a cylinder head 5 and the tip of the housing main body 61.

The valve assembly 3 comprises: a stepped, hollow, cylindrical valve main body 11 having a small-diameter cylinder portion 9 and a large-diameter cylinder portion 10; a valve seat 13 having a fuel injection aperture 12 secured within an end portion of the valve main body 11; a needle valve 14 being a valve body moved into and out of contact with the valve seat 13 to close and open the fuel injection aperture 12; a swirler 15 for guiding the needle valve 14 in the axial direction as well as imparting a swirling motion to the fuel as the fuel flows towards the fuel injection aperture 12; and a movable armature 16 secured to the other end of the needle valve 14.

An intermediate portion of the needle valve 14 is formed with: a guide portion 17 for guiding the needle valve 14 as it slides along the inner circumferential surface of the valve main body 11; and a flange portion 19 for contacting a spacer 18 within the housing main body 61.

The housing main body 61 comprises: a first housing 62 having a flange 20 for mounting the fuel injection valve 60 on the cylinder head 5; and a second housing 22 connected to one end of the first housing 62. An engaging portion 63 is formed on the tip of the first housing 62 and is fastened to the side of the large-diameter cylinder portion 10 by welding, which constitutes a securing means.

Moreover, the valve main body 11 may be secured to the housing main body 61 by inserting the valve main body 11 into the first housing 62 and utilizing the compressive construction resulting from the elasticity of the engaging portion 63 of the stainless steel first housing 62.

The solenoid assembly 4 comprises: a coil 24 of wound wire; a bobbin 25 on which the coil is mounted; a cylindrical core 26 attached to an inner circumferential portion of the bobbin 25; a sleeve 27 secured to the inside of the core 26; a spring 28 compressed and disposed between an end portion of the sleeve 27 and an end portion of the needle valve 14 for pressing the needle valve 14 against the valve seat 13; and terminals 29 electrically connected to the wire of the coil 24.

The swirler 15 constituting part of the valve assembly 3 is a hollow, cylindrical member which has a central aperture 30 at its center for supporting the needle valve 14 so that the needle valve 14 can slide in both axial directions, and is provided with: a first end surface 31 in contact with the valve seat 13; a second end surface 32 at the opposite end from the valve seat 13; and an outer surface 34 between these two end surfaces 31, 32 which comes into contact with an inner circumferential surface 33 of the valve main body 11.

First passages 35 extending radially are formed in the second end surface 32 of the swirler 15 such that fuel flows through the first passages 35 from inner circumferential portions of the second end surface 32 to outer circumferential portions thereof.

Second passages 36 extending longitudinally and connected to the first passages 35 are formed in the outer surface 34 of the swirler 15.

Swirling grooves 37 are formed in the first end surface 31 of the swirler 15 in connection with the second passages 36 for generating a swirling current.

The tip of a fuel injection valve 60 of the above construction is inserted into the fuel injection valve insertion port 6 in a cylinder head 5. An insertion port shoulder portion 38 and a countersunk face 39 are formed within the fuel injection valve insertion port 6.

A metal gasket 40 is disposed between the flange 20 and the countersunk face 39.

Figure 7:
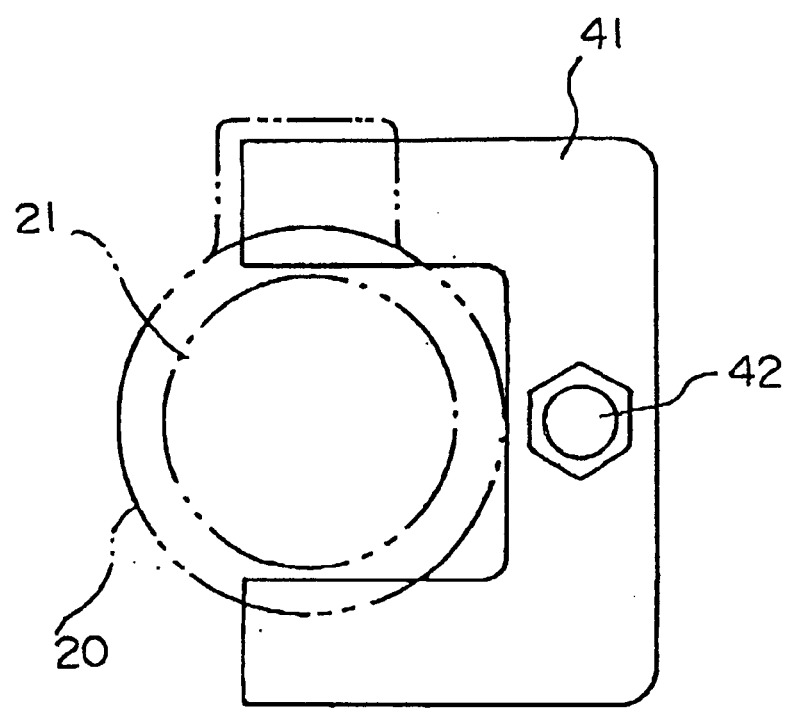
FIG. 7 is a plan view of the fork in FIG. 5.

As shown in FIG. 7, both sides of the flange 20 are pressed against the cylinder head 5 by a fork 41 secured to the cylinder head 5 by a securing bolt 42, whereby the gasket 40 is pressed against the countersunk face 39 and the seal ring 7 is compressed. As a result, one side 43 of the seal ring 7 presses against a smooth flat shoulder portion 64 disposed between the large-diameter cylinder portion 10 and the small-diameter cylinder portion 9, and the other side 45 presses against the surface of the insertion port shoulder portion 38, preventing the high-temperature, high-pressure combustion gas in the cylinder from leaking into the housing main body 61 by means of a double seal construction.

Next, the operation of a fuel injection valve 60 of the above construction will be explained.

When an electric current is supplied to the coil 24 of the solenoid assembly 4 from outside through the terminals 29, a magnetic flux is generated in the magnetic passage formed by the movable armature 16, the core 26, and the housing main body 61, whereby the movable armature 16 is attracted against the elasticity of the spring 28 towards the core 26. Thus, the needle valve 14, which is integrated with the movable armature 16, is moved upwards as far as the position where the flange portion 19 of the needle valve 14 contacts the spacer 18. The guide portion 17 is guided in the axial direction by the inner circumferential surface of the valve main body 11 as the needle valve 14 moves upwards.

As the needle valve 14 moves upwards, the tip of the needle valve 14 is separated from the valve seat 13, forming a gap between the tip thereof and the valve seat 13. As a result, high-pressure fuel fed from a fuel supply pipe 46 flows in through a fuel filter 8, through a fuel passage 47 within the sleeve 27, through the gap formed between the needle valve 14 and the valve main body 11, through the first passages 35 in the second end surface 32 into the second passages 36 in the outer surface 34, then the high-pressure fuel flows into the swirling grooves 37 of the first end surface 31, forms a swirling current inside the swirling grooves 37 and is sprayed from the fuel injection aperture 12 into a cylinder (not shown).

In a fuel injection valve 60 of the above construction, it is possible for one side 43 of the seal ring 7 to contact the smooth, flat shoulder portion 64 because the engaging portion 63 on the tip of the first housing 62 is fastened to the side of the large-diameter cylinder portion 10 by welding and the housing main body 61 and the valve main body 11 are integrated. As a result, since one side 43 of the seal ring 7 is in contact with the shoulder portion 64 and the other side 45 is in contact with the insertion port shoulder portion 38, the high-temperature, high-pressure combustion gas in the cylinder can be prevented from leaking to the housing main body 2 by means of a double seal construction.

Furthermore, the valve seat 13 and the tip of the small-diameter cylinder portion 9 may be exposed to and heated by the high-temperature combustion gas in the cylinder. However, since this heat is transmitted through the valve main body 11 and the seal ring 7 to the cylinder head 5 or through the valve main body 11 to the first housing 62, the valve seat does not reach extremely high temperatures, and therefore blockages of the fuel injection aperture due to the generation and build up of inclusions such as carbon, etc., resulting from denatured fuel can be prevented.

Embodiment 2

Figure 3:
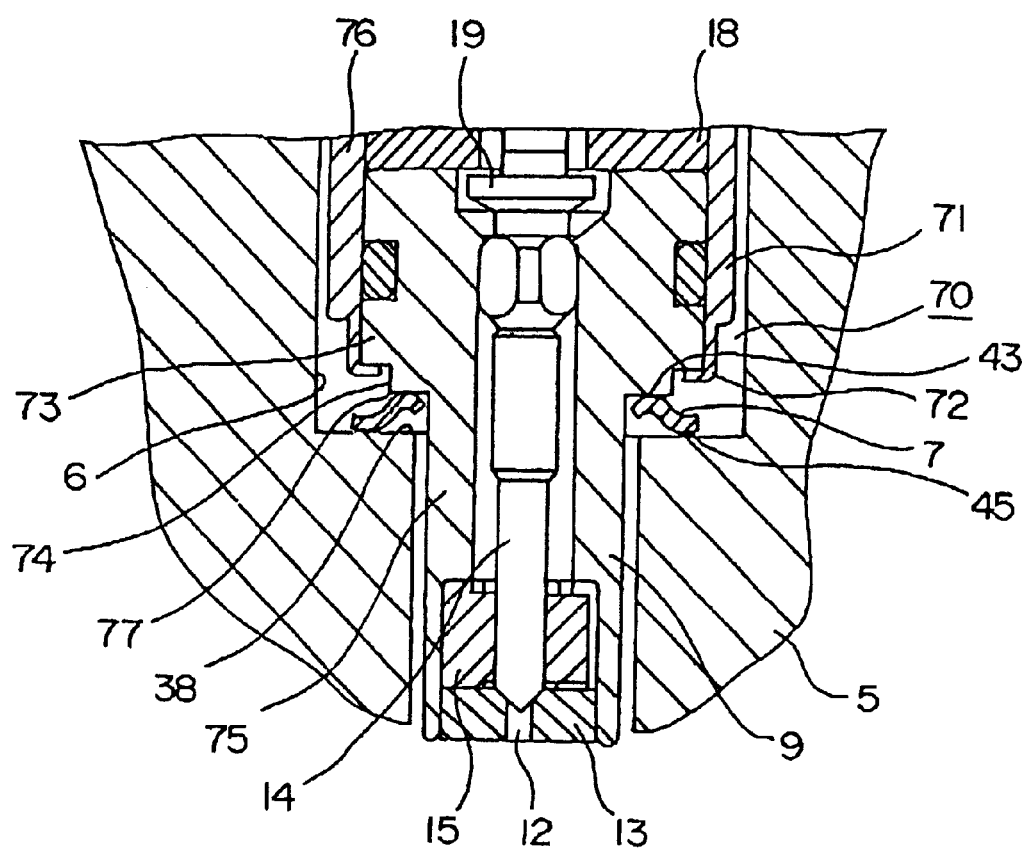
FIG. 3 is a partial cross-section of a cylinder-injection fuel injection valve according to Embodiment 2 of the present invention.

FIG. 3 is a partial cross-section of a cylinder-injection fuel injection valve 70 according to Embodiment 2 of the present invention.

In this embodiment, the securing means for securing a valve main body 75 to a housing main body 76 differs from that of Embodiment 1. That is to say, the valve main body 75 is secured to the housing main body 76 by means of a crimped construction in which an engaging portion 72 on the tip of a first housing 71 constituting part of the housing main body 76 is crimped into a stepped portion 74 formed in the side of a large-diameter cylinder portion 73.

In this embodiment, one side 43 of the seal ring 7 is in contact with a shoulder portion 77 between the small-diameter cylinder portion 9 and the stepped portion 74, and the other side 45 of the seal ring 7 is in contact with the insertion port shoulder portion 38, preventing the high-temperature, high-pressure combustion gas in the cylinder from leaking to the housing main body 76 by means of a double seal construction.

Embodiment 3

Figure 4:
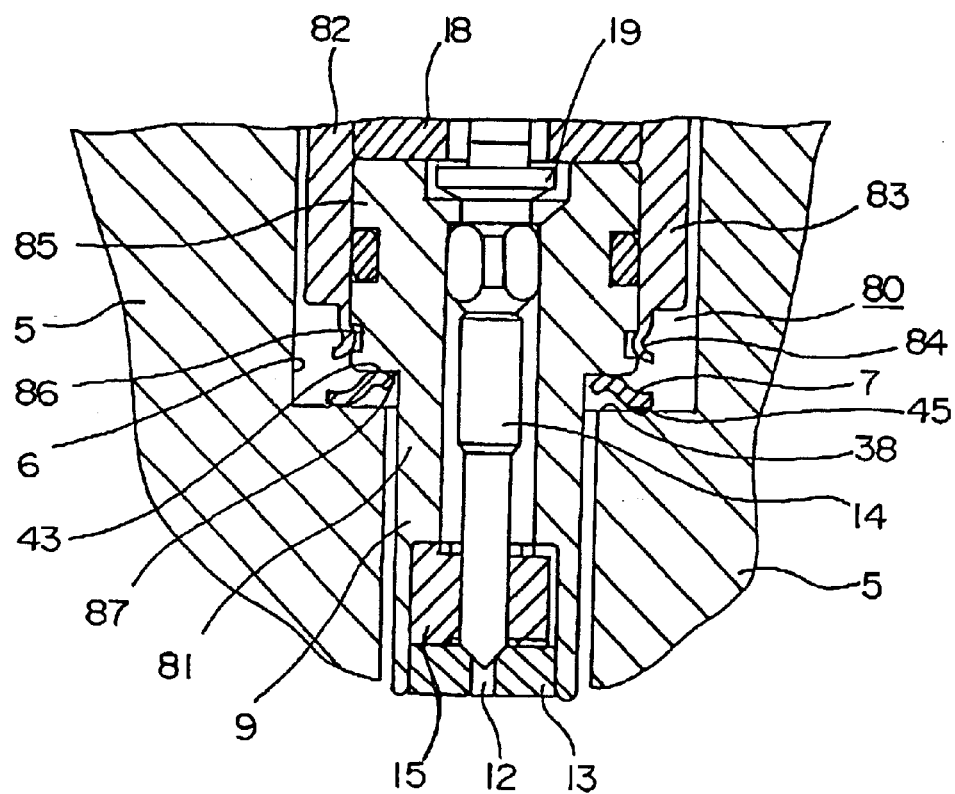
FIG. 4 is a partial cross-section of a cylinder-injection fuel injection valve according to Embodiment 3 of the present invention.
Figure 5:
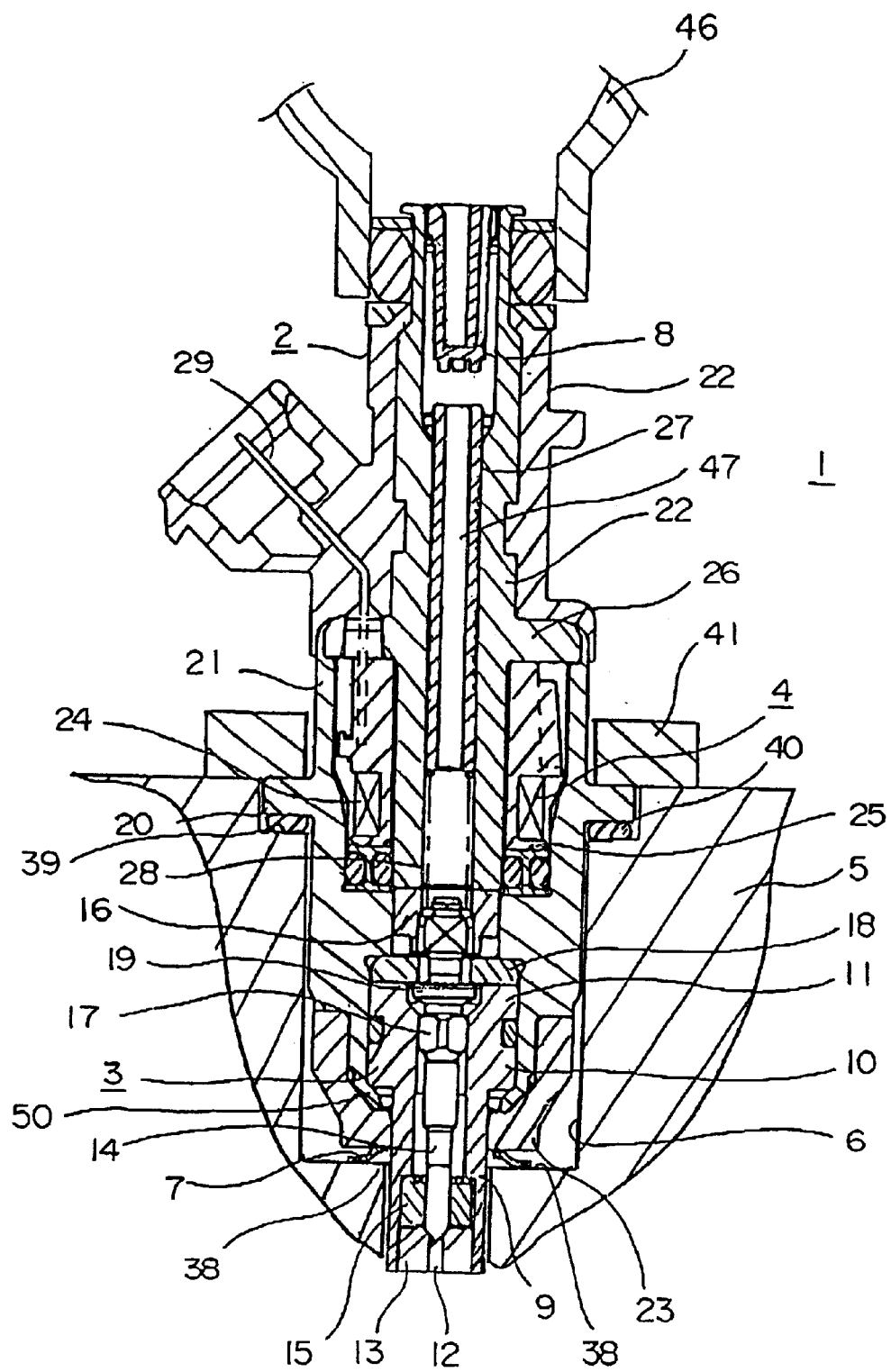
FIG. 5 is a cross-section of a conventional cylinder-injection fuel injection valve.
Figure 6:
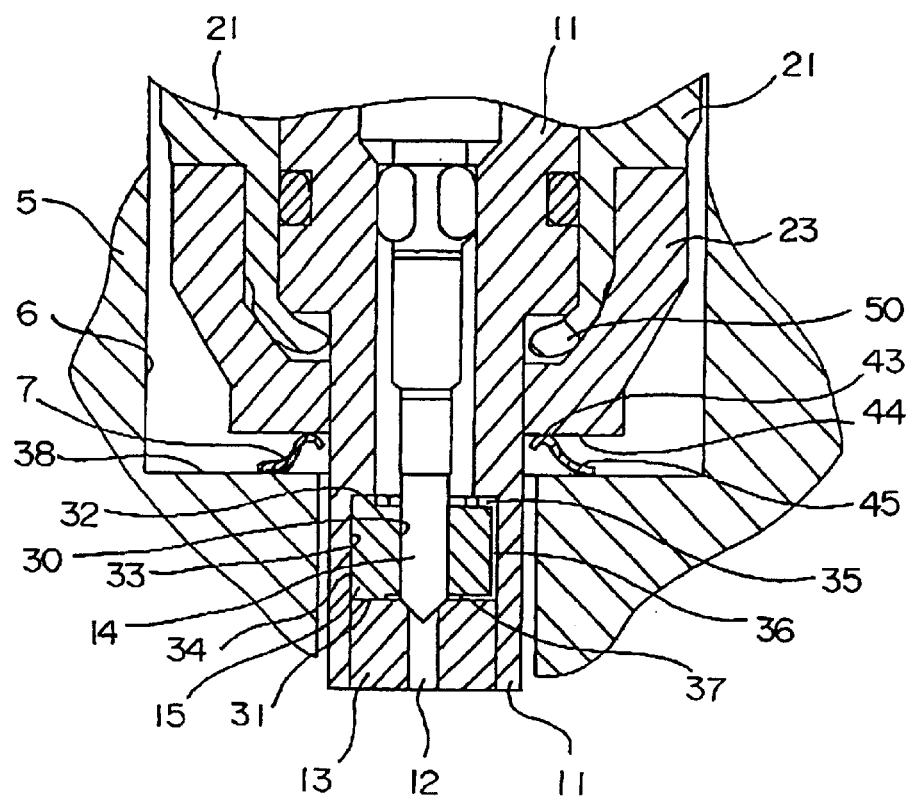
FIG. 6 is a partial enlargement of the cylinder-injection fuel injection valve in FIG. 5.

FIG. 4 is a partial cross-section of a cylinder-injection fuel injection valve 80 according to Embodiment 3 of the present invention.

In this embodiment, the securing means for securing a valve main body 81 to a housing main body 82 differs from that of Embodiment 1. That is to say, the valve main body 81 is secured to the housing main body 82 by means of a crimped construction in which an engaging portion 84 on the tip of a first housing 83 constituting part of the housing main body 82 is crimped into a recessed portion 86 formed in the side of a large-diameter cylinder portion 85 so as to extend circumferentially.

In this embodiment, one side 43 of the seal ring 7 is in contact with a shoulder portion 87 between the small-diameter cylinder portion 9 and the large-diameter cylinder portion 85, and the other side 45 of the seal ring 7 is in contact with the insertion port shoulder portion 38, preventing the high-temperature, high-pressure combustion gas in the cylinder from leaking into the housing main body 82 by means of a double seal construction.

As explained above, the cylinder-injection fuel injection valve of the present invention comprises the securing means for securing the valve main body to the housing main body disposed between the side of the large-diameter cylinder portion and the engaging portion formed on the tip of the housing main body. Therefore, the cylinder-injection fuel injection valve enables use of the shoulder portion as the contact surface for the seal and eliminates the need for the holder conventionally required to ensure a contact surface for the seal ring, allowing manufacturing costs to be reduced as well as eliminating the need for the troublesome operation of fitting the holder on the tip of the housing portion.

In the cylinder-injection fuel injection valve of the present invention, the securing means may be a welded joint. Therefore, the housing main body and the valve main body can be simply and firmly secured to each other. Further, the seal between the housing main body and the valve main body can be ensured, enabling O-rings between the housing main body and the valve main body to be dispensed with.

In the cylinder-injection fuel injection valve of the present invention, the securing means may be a compressive construction wherein the engaging portion presses against the side of the large-diameter cylinder portion. Therefore, the valve main body can be simply secured to the housing main body without using a welding device or the like.

In the cylinder-injection fuel injection valve of the present invention, the securing means may be a crimped construction wherein the engaging portion is crimped into a stepped portion formed in the side of the large-diameter cylinder.

Therefore, the valve main body can be firmly secured to the housing main body.

In the cylinder-injection fuel injection valve of the present invention, the securing means may be a crimped construction wherein the engaging portion is crimped into the recessed portion formed in the side of the large-diameter cylinder portion so as to extend circumferentially. Therefore, the valve main body can be firmly secured to the housing main body.

In the cylinder-injection fuel injection valve of the present invention, the seal may be an elastic seal ring having a wave-shaped cross-section in the direction of the axis of the valve body. Therefore, a plurality of seal constructions can be achieved between the cylinder head and the valve main body, improving the seal against the combustion gas in the cylinder.

What is claimed is:

1. A cylinder-injection fuel injection valve comprising:

a housing main body;

a valve assembly within said housing main body, and comprising: a unitary valve main body having a large-diameter cylinder portion and a small diameter cylinder portion; a shoulder portion defined between said large-diameter and said small diameter cylinder portions; a valve seat having a fuel injection aperture secured within said valve main body; and a valve body moved into and out of contact with said valve seat to close and open said fuel injection aperture;

a seal for preventing combustion gas in a cylinder from leaking to said housing main body wherein said seal is held between a cylinder head and said shoulder portion when said valve assembly is inserted into an insertion port in said cylinder; and a securing means for securing said valve main body to said housing main body, said securing means fastening the outer circumferential side of said large-diameter cylinder portion and an engaging portion formed on said housing main body.

2. The cylinder-injection fuel injection valve according to claim 1 wherein said securing means is a welded joint.

3. The cylinder-injection fuel injection valve according to claim 1 wherein said securing means is a compressive construction wherein said engaging portion presses against the outer side of said large-diameter cylinder portion.

4. The cylinder-injection fuel injection valve according to claim 1 wherein said securing means is a crimped construction wherein said engaging portion is crimped into a recessed portion formed in the outer side of said large-diameter cylinder portion so as to extend circumferentially.

5. The cylinder-injection fuel injection valve according to claim 1 wherein said seal is an elastic seal ring having a wave-shaped cross-section in the direction of the an axis of said valve body.

* * * * *